US010325588B2

(12) United States Patent
Liang et al.

(10) Patent No.: US 10,325,588 B2
(45) Date of Patent: Jun. 18, 2019

(54) ACOUSTIC FEATURE EXTRACTOR SELECTED ACCORDING TO STATUS FLAG OF FRAME OF ACOUSTIC SIGNAL

(71) Applicant: INTERNATIONAL BUSINESS MACHINES CORPORATION, Armonk, NY (US)

(72) Inventors: Xiao Xing Liang, Beijing (CN); Ning Zhang, Beijing (CN); Yu Ling Zheng, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/718,135

(22) Filed: Sep. 28, 2017

(65) Prior Publication Data

US 2019/0096389 A1    Mar. 28, 2019

(51) Int. Cl.
*G10L 15/02* (2006.01)
*G10L 19/22* (2013.01)
*G10L 25/24* (2013.01)
*G10L 25/84* (2013.01)
*G10L 25/30* (2013.01)

(52) U.S. Cl.
CPC .............. *G10L 15/02* (2013.01); *G10L 25/84* (2013.01); *G10L 25/30* (2013.01)

(58) Field of Classification Search
CPC ......... G10L 19/18; G10L 19/20; G10L 19/22; G10L 19/24; G10L 15/02; G10L 25/24
USPC .......................... 704/205, 219, 500, 501, 203
See application file for complete search history.

(56) References Cited

U.S. PATENT DOCUMENTS

| 5,579,432 | A | 11/1996 | Wigren |
| 5,579,435 | A | 11/1996 | Jansson |
| 5,715,372 | A * | 2/1998 | Meyers .................... G10L 15/02 704/200 |
| 5,774,847 | A | 6/1998 | Chu et al. |
| 6,542,866 | B1 * | 4/2003 | Jiang ........................ G10L 15/02 704/240 |
| 7,054,810 | B2 * | 5/2006 | Gao .......................... G10L 15/02 704/231 |
| 7,657,427 | B2 * | 2/2010 | Jelinek ..................... G10L 19/20 704/208 |

(Continued)

OTHER PUBLICATIONS

Chu et al., "Environmental Sound Recognition With Time—Frequency Audio Features," IEEE Transactions on Audio, Speech, and Language Processing, Aug. 2009, p. 1142-1158, vol. 17, No. 6.

*Primary Examiner* — Martin Lerner
(74) *Attorney, Agent, or Firm* — Rakesh Roy (57) ABSTRACT

A method, computer system, and a computer program product for adaptively selecting an acoustic feature extractor in an Artificial Intelligence system is provided. The present invention may include acquiring a frame of an acoustic signal. The present invention may include checking a status of a flag to be used to indicate a proper acoustic feature extractor to be selected. The present invention may include processing the frame of the acoustic signal by the selected acoustic feature extractor indicated by the checked status. The present invention may include determining, based on data generated in the processing of the frame of the acoustic signal, an actual status of the frame of the acoustic signal. The present invention may include updating the status of the flag according to the actual status.

17 Claims, 4 Drawing Sheets

(56) References Cited

U.S. PATENT DOCUMENTS

| | | | |
|---|---|---|---|
| 8,306,821 B2 | 11/2012 | Nongpiur et al. | |
| 8,380,506 B2* | 2/2013 | Jeon | G10L 15/142 |
| | | | 704/231 |
| 8,798,290 B1 | 8/2014 | Choi et al. | |
| 8,849,231 B1 | 9/2014 | Murgia et al. | |
| 9,478,232 B2 | 10/2016 | Hirohata et al. | |
| 9,858,915 B2* | 1/2018 | Kuo | H04R 3/002 |
| 2002/0103643 A1* | 8/2002 | Rotola-Pukkila | G10L 19/012 |
| | | | 704/233 |
| 2006/0089958 A1 | 4/2006 | Giesbrecht et al. | |
| 2008/0019537 A1 | 1/2008 | Nongpiur et al. | |
| 2008/0075303 A1* | 3/2008 | Kim | G10H 1/125 |
| | | | 381/103 |
| 2009/0254352 A1* | 10/2009 | Zhao | G10L 25/78 |
| | | | 704/500 |
| 2011/0191101 A1* | 8/2011 | Uhle | G10L 21/0208 |
| | | | 704/205 |
| 2011/0202337 A1* | 8/2011 | Fuchs | G10L 19/20 |
| | | | 704/231 |
| 2013/0166308 A1* | 6/2013 | Kawashima | G10L 19/24 |
| | | | 704/500 |
| 2014/0046658 A1* | 2/2014 | Grancharov | G10L 25/78 |
| | | | 704/208 |
| 2014/0188465 A1* | 7/2014 | Choo | G10L 19/12 |
| | | | 704/219 |
| 2014/0358525 A1* | 12/2014 | Acero | G10L 19/20 |
| | | | 704/201 |
| 2015/0287415 A1* | 10/2015 | Lombard | G10L 19/012 |
| | | | 704/500 |
| 2016/0240215 A1* | 8/2016 | Suess | G10L 25/69 |

* cited by examiner

ACOUSTIC FEATURE EXTRACTOR SELECTED ACCORDING TO STATUS FLAG OF FRAME OF ACOUSTIC SIGNAL

BACKGROUND

The present invention relates generally to the field of computing, and more particularly to acoustic analysis.

Today is an era of digitalization, especially in complicated business environments, such as IoT (Internet of Things), acoustic based event recognition is an important technology that is widely used, and therefore, Artificial Intelligence (AI) systems based on acoustic based event recognition has been applied more and more in various specific fields of IoT, such as in the fields of smart homes, enterprise asset management, etc. In these application scenarios, the extraction of acoustic features used in event recognition is usually done by mobile devices or sensors in which power consumption is an important factor, since extracting features consumes large part of energy as a long-running background task.

SUMMARY

Example embodiments of the present disclosure provide a new approach for selecting an acoustic feature extractor that is used in an Artificial Intelligence system.

In an aspect, a computer-implemented method used for selecting an acoustic feature extractor is provided. The method comprises: acquiring a frame of acoustic signal; checking status of a flag for indicating a feature extractor to be selected; processing the frame of acoustic signal by the acoustic feature extractor indicated by the checked status; determining, based on data generated in the processing of the frame of acoustic signal, an actual status of the frame of acoustic signal; determining a new status of the flag according to the actual status.

In another aspect, a computer system for adaptively selecting an acoustic feature extractor is provided. The computer system includes a processing unit and a memory coupled to the processing unit and storing instructions thereon. The instructions may be executed by the processing unit to perform acts including: acquiring a frame of acoustic signal; checking status of a flag for indicating a feature extractor to be selected; processing the frame of acoustic signal by the acoustic feature extractor indicated by the checked status; determining, based on data generated in the processing of the frame of acoustic signal, an actual status of the frame of acoustic signal; and determining a new status of the flag according to the actual status.

In yet another aspect, a computer program product used for selecting an acoustic feature extractor is proposed. The computer program product being tangibly stored on a non-transient machine-readable medium and comprising machine-executable instructions, the instructions, when executed on an electronic device, causing the electronic device to perform following operations. The operation comprises: acquiring a frame of acoustic signal; checking status of a flag for indicating a feature extractor to be selected; processing the frame of acoustic signal by the acoustic feature extractor indicated by the checked status; determine, based on data generated in the processing of the frame of acoustic signal, an actual status of the frame of acoustic signal; and determine new status of the flag according to the actual status.

Other features of the present disclosure will become easily comprehensible through the description below.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Throughout the drawings, the same or similar reference numerals represent the same or similar elements.

DETAILED DESCRIPTION

Detailed embodiments of the claimed structures and methods are disclosed herein;

however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As described previously, today is an era of digitalization, especially in complicated business environments, such as IoT (Internet of Things), acoustic based event recognition is an important technology that is widely used, and therefore, Artificial Intelligence (AI) systems based on acoustic based event recognition has been applied more and more in various specific fields of IoT, such as in the fields of smart homes, enterprise asset management, etc. In these application scenarios, the extraction of acoustic features used in event recognition is usually done by mobile devices or sensors in which power consumption is an important factor, since extracting features consumes large part of energy as a long-running background task.

Therefore, the challenges may be that devices with acoustic sensors are small and energy critical, which makes how to decrease energy consuming and ensure the accuracy of feature extracting in the meantime valuable.

Figure 1:
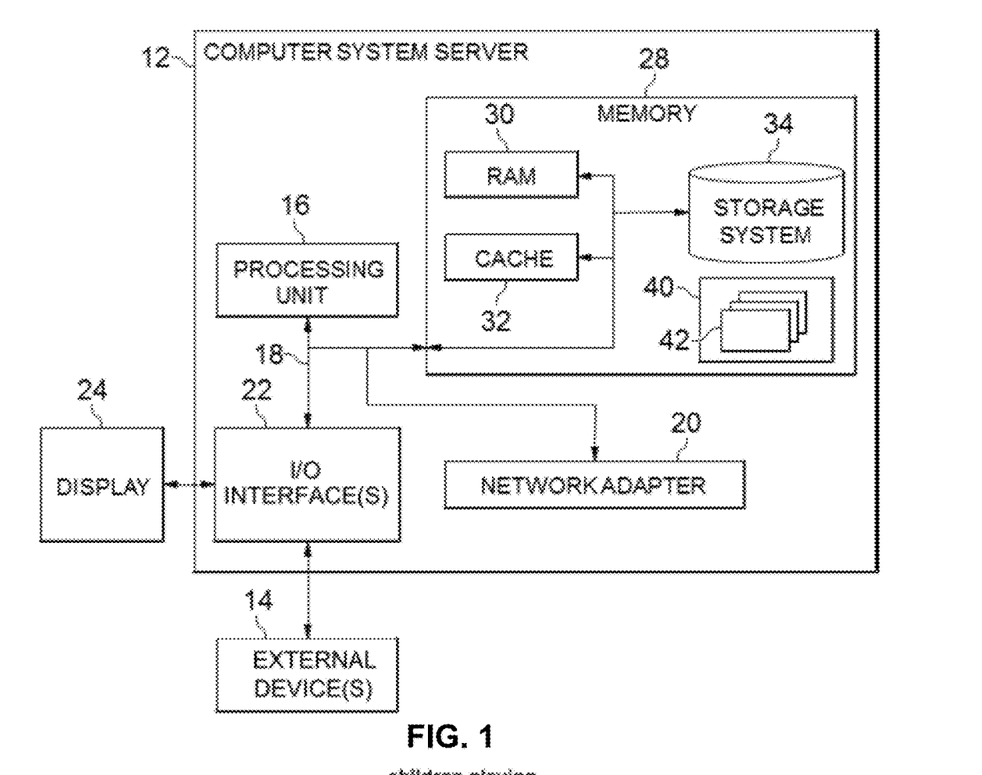
FIG. 1 is a block diagram illustrating a device suitable for implementing embodiments of the present disclosure.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

More and more devices are connected to networks nowadays, especially that various devices with acoustic sensors are increasingly instrumented in Artificial Intelligence (AI) systems for event recognition. Usually, acoustic feature extractors may be used to extract features that may be used in machine learning, such as supervised learning or unsupervised learning. In one example of supervised learning, a classifier for recognizing a specific event may be trained base on features extracted from acoustic signals of a train set, and the trained classifier may be used in an actual AI context to recognize specific event based on features extracted from acoustic signals in real-time. Unfortunately, features extraction may consume large part of energy as a long-running background task.

To further reduce energy consuming of feature extraction, a proper feature extractor may be selected adaptively based on characteristic of acoustic signal. Usually, the acoustic signal may be classified as stationary signals or non-stationary based on characteristic of acoustic signal.

Figure 2A:
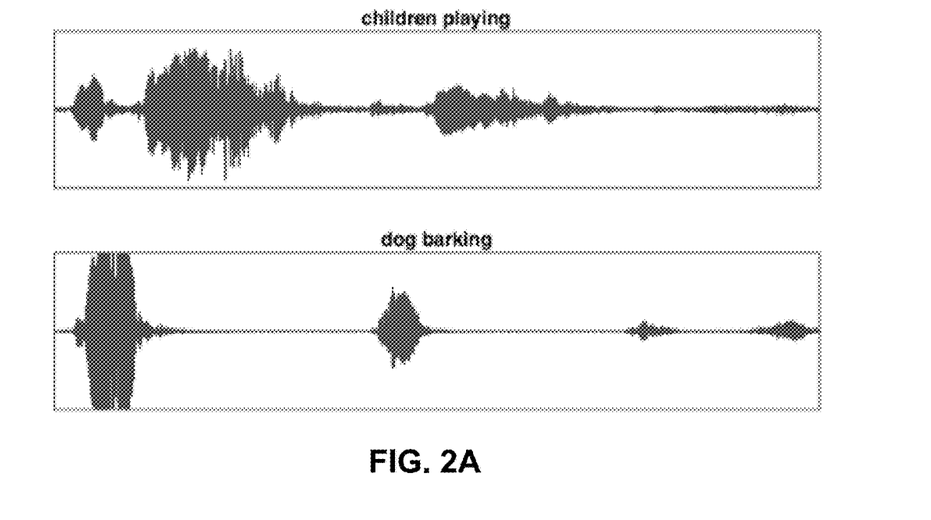
FIG. 2A shows several examples of non-stationary acoustic signals in accordance with embodiments of the present disclosure.

FIG. 2A shows several examples of non-stationary acoustic signals in accordance with embodiments of the present disclosure. Non-stationary signals may vary in frequency and/or amplitude relatively quickly over time, as shown in FIG. 2A, each one of the acoustic signals of children playing and a dog barking may be an example of non-stationary acoustic signal.

Figure 2B:
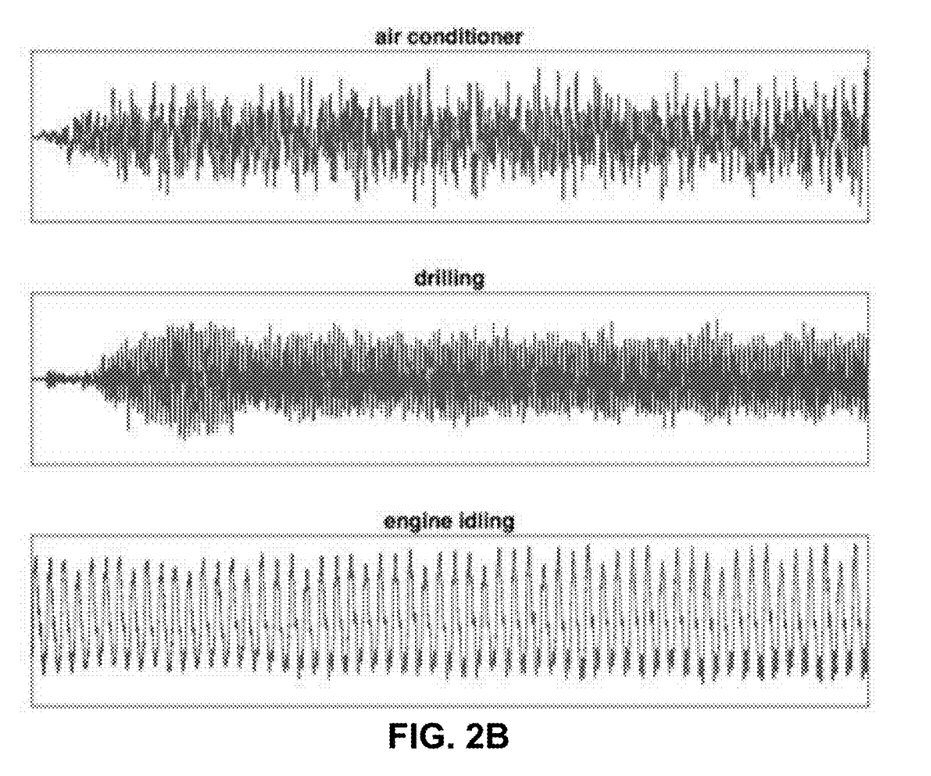
FIG. 2B shows several examples of stationary signals/quasi-stationary signals in accordance with embodiments of the present disclosure.

FIG. 2B shows several examples of stationary signals/quasi-stationary signals in accordance with embodiments of the present disclosure. Stationary signals/Quasi-stationary signals may change in frequency and/or amplitude less frequently than non-stationary signals, as shown in FIG. 2B, each one of the acoustic signals of an air conditioner, drilling, and an engine idling may be an example of stationary signals/quasi-stationary signals. Similarly, the stationary signals/quasi-stationary signals may also arise from machine noise, a controlled human voice, or from other sources such as slowly changing engine noise or alternator whine.

Different from the traditional method that uses front-detection methods to differentiate a stationary signal from a non-stationary signal by using a costly special computation unit, the present invention may use a post-detection method to do the differentiating of the acoustic signal. By using the result of the acoustic feature extraction in the post-detection method, the calculation amount may be reduced and the power consumption of the whole system may be reduced accordingly.

Figure 3:
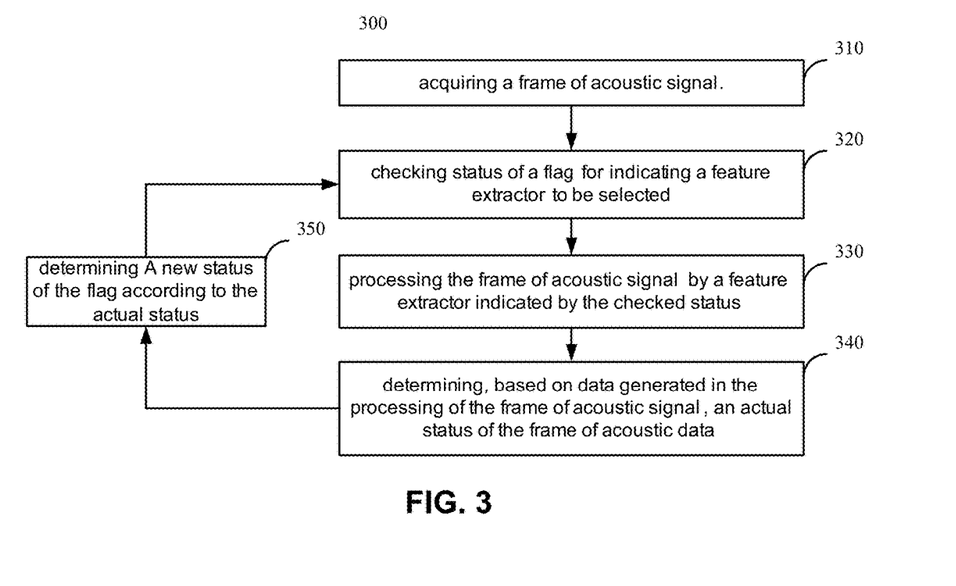
FIG. 3 shows an example flowchart of a computer-implemented method used for adaptively selecting an acoustic feature extractor in accordance with exemplary embodiments of the present disclosure.

FIG. 3 shows an example flowchart of a computer-implemented method 300 used for adaptively selecting an acoustic feature extractor in accordance with exemplary embodiments of the present disclosure.

In one example, the acoustic feature extractor may be used for extracting feature for a classifier used in an Artificial Intelligence system for event recognition, multiple kinds of classifiers may be implemented, such as artificial neural networks (ANN), support vector machine (SVM), and random forest (RF), etc. It is to be understood by those skilled in the art that the present disclosure should not be limited to the classifiers implements, but to any suitable machine learning systems as described above.

The method 300 starts at step 310.

In step 310, a frame of acoustic signal may be acquired.

In one embodiment, the acoustic signal may be segmented into multiple frames of acoustic signal by using a window. In one example, the segmentation of acoustic signal may be performed by a time window with a predetermined period. In another example, the segmentation of acoustic signal may be performed by using Hamming window.

In some embodiments, other kinds of pre-processing may be done, such as if the current frame of acoustic signal is detected as background noise then the frame will be discarded and the next frame of acoustic signal will be acquired for further processing, which will be described in greater detail below with reference to FIG. 4.

In step 320, the status of a flag for indicating a proper acoustic feature extractor to be selected may be checked. In one embodiment, the checked status and the new status of a flag may comprise a first status and a second status, wherein, the first status of the flag indicates a low-cost feature extractor associated with quasi-stationary acoustic signal, the second status of the flag indicates a high-cost feature extractor associated with non-stationary acoustic signals.

In one embodiment, the low-cost feature extractor may be a LPC family based feature extractor, wherein, the LPC is a short name of Linear Predictive Cepstral Coefficients. For a LPC family based acoustic feature extractor, the LPC family based feature may be the LPC and its variables, which includes various of derivative of the LPC, such as running mean of the LPC, standard deviation of the LPC, derivative of a running mean LPC, a derivative of the standard derivative of the LPC, difference of the LPC etc. Those skilled in the art will know how to apply and select a specific LPC feature extractor.

In another embodiment, the high-cost feature extractor may be an MFCC family based feature extractor, wherein, the MFCC is a short name of Mel-frequency cepstral coefficients. For a MFCC family based acoustic feature extractor, the MFCC family based feature may be the MFCC and its variables, which includes different Mel filter banks, derivative of the MFCC, running mean of the MFCC, standard deviation of the MFCC, derivative of a running mean MFCC, derivative of the standard derivative of the MFCC etc.

The status of a flag may be represented by different status values, for example, "0" may represent the first status, and "1" may represent the second status. It is to be noted that, other kinds of flag may be used in the present invention, for example, different characters or words may be used as the status value, so long as they could be differentiated and identified in the step of checking status of a flag.

In one embodiment, the status of the flag may be initialized as any one of the two statuses. In such embodiment, the initialized status may not fit the first coming new frame of acoustic signal very well, but the status of the flag may be adjusted to a more proper value based on the actual status determined by the following steps. In another further embodiment, the status of the flag may be initialized as the second status of the flag for the first frame of acoustic signal, meaning that the characteristic of the first frame of acoustic signal may be unknown, but the first frame of acoustic signal may be guaranteed to be processed by a high-cost feature extractor with less loss of accuracy, even though the first frame of acoustic signal may be a stationary signal.

In step 330, the frame of acoustic signal may be processed by the selected acoustic feature extractor indicated by the checked status. Usually, the frame of acoustic signal may be processed by a specified selected feature extractor, and some data may be generated and be inputted to an Artificial Intelligence system for event recognizing.

In one embodiment, in response to the flag being the first status, the low-cost feature extractor may be selected for processing the frame of acoustic signal. In this embodiment, the data generated includes features extracted by the selected low-cost feature extractor, for example, an LPC family based low-cost feature extractor, and then, the data generated may include the LPC feature vector extracted from the frame of acoustic signal. And then, the extracted feature may not only be sent to a classifier but also be used in step 340 for determining an actual status of the frame of acoustic signal, which will be further discussed with reference to the steps 4401-4402 of FIG. 4.

In another embodiment, in response to the flag being the second status, the high-cost feature extractor may be selected, for example an MFCC based high-cost feature extractor, for processing the frame of acoustic signal. In this embodiment, the data generated may include MFCC features extracted by the MFCC based feature extractor. In this embodiment, the data generated may also include generating an intermediate result, for example the fast Fourier transform (FFT) values, in the processing of extracting the MFCC feature. And then, in this embodiment, the extracted MFCC feature may be sent to a classifier, but the intermediate result may be used in step 340 for determining an actual status of the frame of acoustic signal, which will be further discussed with reference to the steps 4403-4404 of FIG. 4.

In step 340, an actual status of the frame of acoustic signal may be determined based on data generated in the processing of the frame of acoustic signal by the selected feature extractor.

In one embodiment, if the frame of acoustic signal has been processed by a low-cost feature extractor selected by step 330 as previous described, then whether the frame of acoustic signal is quasi-stationary signal or not may be determined based on data generated in the processing of the frame of acoustic signal by the low-cost feature extractor. The details of the use of the data generated will be described with reference to the steps 4401-4402 of FIG. 4.

In another embodiment, if the frame of acoustic signal has been processed by a high-cost feature extractor selected by step 330 as previous described, then whether the frame of acoustic signal is quasi-stationary signal or not may be determined based on data generated in the processing of the frame of acoustic signal by the high-cost feature extractor. The details of the use of the data generated will be described regarding the steps 4403-4404 of FIG. 4.

In step 350, the new status of a flag may be determined according to the actual status.

In one embodiment, the actual status may be compared with the checked status firstly, and then, the new status of a flag may be determined based on comparing the result.

In one example of this embodiment, the actual status of the frame of acoustic signal may be the same with the current value of status. Therefore, in this example, when determining the status of a flag according to the determined actual status, in response to the determined actual status being the same as the checked status, the status of the flag may be maintained unchanged. Thus, there is no need to change the status of the flag.

In another example of this embodiment, the actual status of the frame of acoustic signal may be different from current value of status. Therefore, in this example, when determining the status of a flag according to the actual status, in response to the actual status being different from the checked status, the checked status of the flag may be updated to the actual status. Thus, the status needs to be replaced by the actual status.

Figure 4:
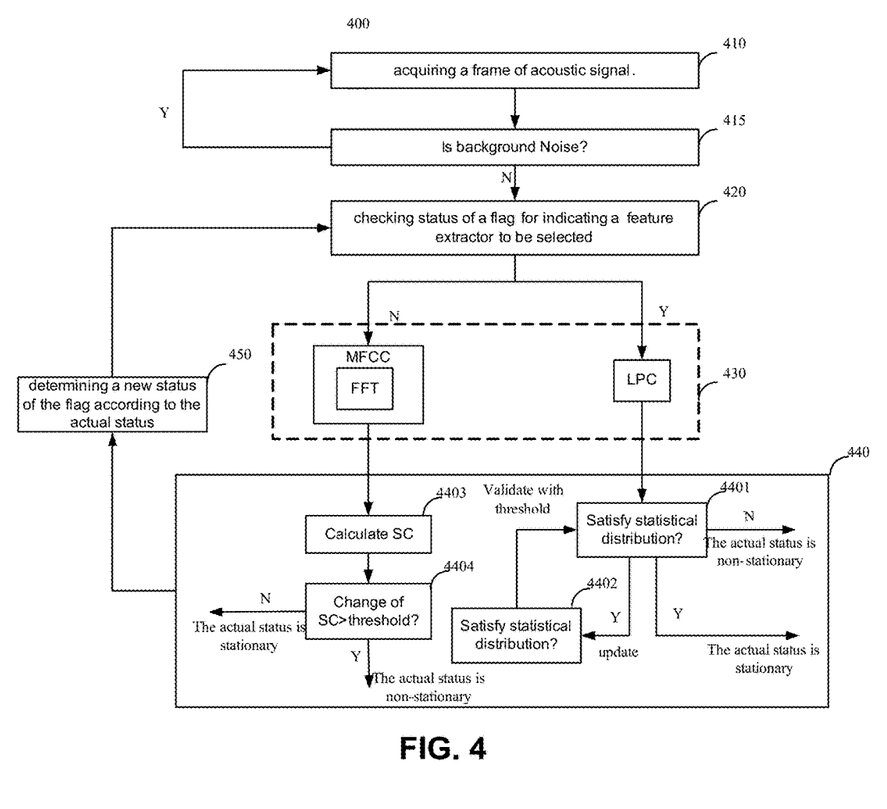
FIG. 4 shows another specific example flowchart of a computer-implemented method used for adaptively selecting an acoustic feature extractor in accordance with exemplary embodiments of the present disclosure.

FIG. 4 shows another specific example flowchart of a computer-implemented method 400 used for adaptively selecting an acoustic feature extractor in accordance with exemplary embodiments of the present disclosure.

Method 400 starts at Step 410. Step 410, step 420 and step 450 are similar to steps 310, step 320 and 350, respectively, as described previously in FIG. 3. Thus, the detailed description is omitted for those three steps.

In step 415, whether the acoustic signal frame is background noise is determined. In response determining that the frame of acoustic signal is background noise, method 400 returns to step 410 to acquire the next frame of acoustic signal, and, in response to determining that the frame of acoustic signal is not background noise, entering the step 420 to check status of a flag. In one embodiment, zero-crossing rate (ZCR) may be used to detect whether the acoustic signal frame is background noise.

If the currently acquired frame of the acoustic signal frame is determined to not be background noise, then the current acoustic signal frame may be valuable or effective to be used in an AI system for further feature extracting. It is to be noted that step 415 is an optional step and omitting this step may add some unnecessary processing on the background noise, but may not have substantially influence on the implementation of the present invention.

In step 430, in response to the flag being the first status indicating low-cost feature extractor to be selected, an LPC based feature extractor may be selected for processing the frame of acoustic signal, and, in response to the flag being the second status that indicating non-stationary, an MFCC based feature extractor may be selected for processing the frame of acoustic signal.

In one embodiment, the LPC based feature extractor may be taken as an example of the low-cost feature extractor. The LPC feature extractor is a common and regularly used for processing in the field of voice recognition, usually a vector that has predefined numbers of LPC coefficients as element of the vector may be generated after the processing of extracted features. For example, the predefined number of coefficients may be 5 or 10, with a larger number indicating a more accurate LPC based feature will be extracted.

In another embodiment, the MFCC based feature extractor may be taken as an example of the high-cost feature extractor. The MFCC feature extractor is also a common and regularly used for processing in the field of voice recognition. In this embodiment, FFT values may be generated as intermediate data in the processing of extracted MFCC features from frames of acoustic signal by the MFCC feature extractor.

In step 440, if the frame of acoustic signal has been processed by a low-cost feature extractor, for example LPC family based feature extractor, which is selected in step 430 as previous described, then whether the frame of acoustic signal is quasi-stationary signal or not may be determined based on data generated in the processing of the frame of acoustic signal by the selected LPC based feature extractor.

In one embodiment, step 4401 and step 4402 may be further included in step 440 for determining the actual status.

In step 4401, based on whether the new generated LPC features satisfy a statistical distribution of LPC coefficients, the actual status of the frame of acoustic signal may be determined.

To be specific, in one embodiment, in response to determining that the new generated LPC features do not satisfy the distribution, the signal may be treated as non-stationary signal, and then the actual status may be the second status associated with non-stationary acoustic signal; and in this embodiment, in response to the new generated LPC features satisfy the distribution, the signal may be treated as stationary signal, and then the actual status may be the first status associated with stationary acoustic signal. Next, more details regarding how to determine whether the new generated LPC features satisfy the distribution will be described in a further embodiment. In this further embodiment, if the new generated LPC features fall into a predetermined confidence interval of the statistical distribution of LPC coefficients, the new generated LPC features may be determined to satisfy the distribution, otherwise, the new generated LPC features may be determined to not satisfy the distribution.

In one embodiment, a statistical distribution of LPC coefficients may be used to check if the acquired frame of acoustic signal is stationary or non-stationary. A further embodiment will be described to illustrate how the statistical distribution of LPC coefficients is generated.

To obtain the statistical distribution of LPC coefficients, multiple LPC features need to be acquired through the processing of multiple frames of acoustic signal by the LPC feature extractor, in which, each one of the multiple LPC features corresponding to one of the frames of acoustic signals. And then, the statistical distribution of LPC may be generated based on the acquired LPC features. In one example, the statistical distribution of LPC may be norm distribution, and the norm distribution of LPC may be generated based on arithmetic mean value of each LPC feature vector. It should also be noted that, in some alternative implementations, a weighted average value of each LPC feature vector may be used for generating the statistical distribution of LPC. As described above, the extracted LPC family based feature may not only be sent to a classifier but also be used in step 4401 for determining the actual status of the frame of acoustic signal, the LPC extracting result may be reused and extra calculations for front checking may be avoided.

In step 4402, to make the statistical distribution of LPC more accurate, the generated distribution may be adjusted based on the feature extracted for a new frame of acoustic signal according to one embodiment of present invention.

In another embodiment, step 4403 and step 4404 may be included in step 440 for determining the actual status.

In step 4403, a spectral centroid may be calculated based on the acquired FFT values.

If the frame of acoustic signal has been processed by a high-cost feature extractor selected, for example MFCC family based high-cost feature extractor, by step 430 as previously described, then whether the frame of acoustic signal is quasi-stationary signal or not may be determined based on data generated in the processing of the frame of acoustic signal by the selected MFCC based feature extractor.

In this embodiment, such as the MFCC based feature extractor for example, the spectral centroid may be calculated to check if the acquired frame of acoustic signal is stationary or non-stationary. The spectral centroid is a measure used in digital signal processing to characterize a spectrum. It indicates where the "center of mass" of the spectrum is. It is calculated as the weighted mean of the frequencies present in the signal, determined using a Fourier transform, with their magnitudes as the weights. In this embodiment, the spectral centroid is calculated based on FFT values that are acquired from the data generated when extracting feature from the incoming frame of acoustic signal by the MFCC feature extractor, the FFT values may be the intermediate result generated in the processing of frame of acoustic signal.

And then, in step 4404, the calculated spectral centroid and a predetermined threshold are used to determine the actual status. In one example, if the spectral centroid calculated for a new incoming frame is nearly the same as spectral centroid of the previous one frame, then the new incoming frame of acoustic signal can be treated as quasi-stationary. Thus, the actual status may be determined as stationary, otherwise, the actual status may be determined as non-stationary.

In a further embodiment, to determinate whether the new incoming frame is nearly the same as the spectral centroid of the previous one frame, the change of the spectral centroid may be compared with a predefined threshold. In response to the change being below the threshold, the actual status may be determined as stationary; in response to the change being over the threshold, then the actual status may be determined as non-stationary.

As described above, the spectral centroid calculated is calculated based on FFT values of the data generated when extracting feature from the incoming frame of acoustic signal by the MFCC feature extractor. Therefore, the MFCC extracting result may be reused and extra calculation may be avoided.

Therefore, the existing costly special computation unit for distinguishing stationary signals from non-stationary signals up front may be omitted. The present invention may provide easier calculations and extreme low cost compared with prior methods, because the calculation of the prior methods is computationally expensive. And moreover, the feature extractor may be dynamically and adaptively used for different kinds of acoustic signals to reduce the overall computation workload.

It should also be noted that, in some alternative implementations, the functions noted in the block may occur out of the order noted in the figures. For example, the two steps 415 and 420 shown in succession may, in fact, be executed substantially concurrently, or may, in fact, be executed in the reversed order.

Different from traditional methods, this method of the present invention uses a post-detection method to judge whether the frame of sound signal is a stationary-signal or a non-stationary signal. By reusing the intermediate result of the acoustic feature extraction module, the calculation amount and power consumption of the whole system may be reduced. While using high-power-cost feature extractor as one branch and low-power-cost feature extractor as another branch, the post-detection based feedback mechanism allows a significant energy saving effect over the high accuracy of a stationary detection module used previously.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting an acoustic feature extractor, the method comprising:
   acquiring a frame of an acoustic signal;
   checking a status of a flag for indicating an acoustic feature extractor to be selected;
   processing the frame of the acoustic signal by the acoustic feature extractor indicated by the checked status;
   determining, based on data generated in the processing of the frame of the acoustic signal, an actual status of the frame of the acoustic signal; and
   determining a new status of the flag based on the determined actual status,
   wherein the checked status of the flag and the determined new status of the flag includes a first status and a second status, wherein the first status indicates a Linear Predictive Cepstral Coefficients (LPC) based feature extractor associated with a stationary acoustic signal and the second status indicates a Mel-frequency Cepstral Coefficients (MFCC) based feature extractor associated with a non-stationary acoustic signal.

2. The method of claim 1, wherein,
   processing the frame of the acoustic signal by the acoustic feature extractor indicated by the checked status further comprises: in response to the status of the flag being the first status, selecting the LPC based feature extractor for processing the frame of the acoustic signal.

3. The method of claim 1, wherein,
   processing the frame of the acoustic signal by the acoustic feature extractor indicated by the checked status further comprises: in response to the flag being the second status, selecting the MFCC based feature extractor for processing the frame of the acoustic signal.

4. The method of claim 1, wherein, determining the new status of the flag according to the actual status further comprises:
   comparing the actual status with the checked status;
   in response to the actual status being the same as the checked status, maintaining the status of the flag unchanged; and
   in response to the actual status being different from the checked status, updating the checked status of the flag to the actual status.

5. The method of claim 1, wherein,
   processing the frame of the acoustic signal by the acoustic feature extractor indicated by the checked status comprising: processing the frame of the acoustic signal by the LPC based feature extractor as the acoustic feature extractor indicated by the checked status; and
   determining, based on data generated in the processing of the frame of the acoustic signal, the actual status of the frame of the acoustic signal comprising: determining, based on whether a newly generated LPC feature of the frame of the acoustic signal satisfies a statistical distribution of LPC coefficients, the actual status of the frame of the acoustic signal.

6. The method of claim 5, wherein the statistical distribution of LPC coefficients is determined by acquiring the newly generated LPC feature for each one of multiple frames of the acoustic signal and generating the statistical distribution of LPC coefficients based on the acquired newly generated LPC feature.

7. The method of claim 1, wherein,
processing the frame of the acoustic signal by the acoustic feature extractor indicated by the checked status comprising: processing the frame of the acoustic signal by the MFCC based feature extractor as the acoustic feature extractor indicated by the checked status; and
determining, based on data generated in the processing of the frame of the acoustic signal, the actual status of the frame of the acoustic signal comprising:
acquiring a Fast Fourier Transform (FFT) value from data generated by the MFCC based feature extractor;
calculating a spectral centroid based on the acquired FFT value; and
determining the actual status based on the relationship between the calculated spectral centroid and a predetermined threshold.

8. The method of claim 1, wherein acquiring a frame of the acoustic signal further comprises:
determining whether the frame of the acoustic signal is background noise;
in response to the frame of acoustic data is background noise, acquiring a next frame of the acoustic signal; and
in response to the frame of the acoustic signal is not background noise, entering a checking status of the flag.

9. A computer system for selecting an acoustic feature extractor, the computer system having a processing unit and a memory coupled to the processing unit and storing instructions thereon, the instructions executed by the processing unit to perform a method comprising:
acquiring a frame of an acoustic signal;
checking a status of a flag for indicating an acoustic feature extractor to be selected;
processing the frame of the acoustic signal by the acoustic feature extractor indicated by the checked status;
determining, based on data generated in the processing of the frame of the acoustic signal, an actual status of the frame of the acoustic signal; and
determining a new status of the flag based on the determined actual status,
wherein the checked status of the flag and the determined new status of the flag includes a first status and a second status, wherein the first status indicates a Linear Predictive Cepstral Coefficients (LPC) based feature extractor associated with a stationary acoustic signal and the second status indicates a Mel-frequency Cepstral Coefficients (MFCC) based feature extractor associated with a non-stationary acoustic signal.

10. The system of claim 9, wherein,
processing the frame of the acoustic signal by the acoustic feature extractor indicated by the checked status further comprises: in response to the status of the flag being the first status, selecting the LPC based feature extractor for processing the frame of the acoustic signal.

11. The system of claim 9, wherein,
processing the frame of the acoustic signal by the acoustic feature extractor indicated by the checked status further comprises: in response to the flag being the second status, selecting the MFCC based feature extractor for processing the frame of the acoustic signal.

12. The system of claim 9, wherein, determining the new status of the flag according to the actual status further comprises:
comparing the actual status with the checked status;
in response to the actual status being the same as the checked status, maintaining the status of the flag unchanged; and
in response to the actual status being different from the checked status, updating the checked status of the flag to the actual status.

13. The system of claim 9, wherein,
processing the frame of the acoustic signal by the acoustic feature extractor indicated by the checked status comprising: processing the frame of the acoustic signal by the LPC based feature extractor as the acoustic feature extractor indicated by the checked status; and
determining, based on data generated in the processing of the frame of the acoustic signal, the actual status of the frame of the acoustic signal comprising: determining, based on whether a newly generated LPC feature of the frame of the acoustic signal satisfies a statistical distribution of LPC coefficients, the actual status of the frame of the acoustic signal.

14. The system of claim 13, wherein the statistical distribution of LPC coefficients is determined by acquiring the newly generated LPC feature for each one of multiple frames of the acoustic signal and generating the statistical distribution of LPC coefficients based on the acquired newly generated LPC feature.

15. The system of claim 9, wherein,
processing the frame of the acoustic signal by the acoustic feature extractor indicated by the checked status comprising: processing the frame of the acoustic signal by the MFCC based feature extractor as the acoustic feature extractor indicated by the checked status; and
determining, based on data generated in the processing of the frame of the acoustic signal, the actual status of the frame of the acoustic signal comprising:
acquiring a Fast Fourier Transform (FFT) value from data generated by the MFCC based feature extractor;
calculating a spectral centroid based on the acquired FFT value; and
determining the actual status based on the relationship between the calculated spectral centroid and a predetermined threshold.

16. The system of claim 9, wherein acquiring a frame of the acoustic signal further comprises:
determining whether the frame of the acoustic signal is background noise;
in response to the frame of acoustic data is background noise, acquiring a next frame of the acoustic signal; and
in response to the frame of the acoustic signal is not background noise, entering a checking status of the flag.

17. A computer program product used for selecting an acoustic feature extractor, the computer program product comprising a computer readable storage medium having program instructions embodied therewith, the program instructions executable by one or more processors to cause the one or more processors to:
acquiring a frame of an acoustic signal;
checking a status of a flag for indicating an acoustic feature extractor to be selected;
processing the frame of the acoustic signal by the acoustic feature extractor indicated by the checked status;

determining, based on data generated in the processing of the frame of the acoustic signal, an actual status of the frame of the acoustic signal; and determining a new status of the flag based on the determined actual status, wherein the checked status of the flag and the determined new status of the flag includes a first status and a second status, wherein the first status indicates a Linear Predictive Cepstral Coefficients (LPC) based feature extractor associated with a stationary acoustic signal and the second status indicates a Mel-frequency Cepstral Coefficients (MFCC) based feature extractor associated with a non-stationary acoustic signal.

* * * * *